UNITED STATES PATENT OFFICE.

P. H. VANDER WEYDE, OF PHILADELPHIA, PENNSYLVANIA.

IMPROVEMENT IN THE MANUFACTURE OF LIQUIDS FOR MAKING ICE, AND FOR OTHER PURPOSES.

Specification forming part of Letters Patent No. 72,431, dated December 17, 1867.

*To all whom it may concern:*

Be it known that I, P. H. VANDER WEYDE, M. D., of the city and county of Philadelphia, State of Pennsylvania, have invented an Improvement in the Manufacture of Ice, and in the art of cooling and heating substances.

The first consists in the use of the lighter and very volatile hydrocarbons, which are obtained at the first stage of the distillation of petroleum, and by the redistillation of ben zine and the other similar light products, and might be advantageously collected at the wells, before the most volatile and, for my purpose, best parts are lost by evaporation during transport.

The very lightest of those products being gaseous at the common temperature, require a condensing-pump and cooling-mixture around the condensing-tubes, in order to be transformed into the liquid state. Their degree of volatility depends on the pressure under which they have been condensed, and the degree of cold used in condensation, after the less volatile parts have previously been liquefied by less cold and pressure; and as petroleum consists of a great number of volatile liquids of different degrees of volatility and specific gravity, almost any desired degree of volatility may be obtained, when providing the proper conditions. In fact, I have, by repeated distillation at low temperatures, and even without the application of heat, exposing the oil to the suction of a vacuum, stirring it continually, and exposing the vapor evolved to pressure and artificial cold, obtained liquids, of which the boiling-point was at 60°, 50°, 40°, and even 30° Fahrenheit, the last of which, being, in its chemical composition, similar to the so-called hydride of propyle, I have called chimogene, meaning cold-generator, as its spontaneous evaporation produces an intense cold.

This liquid, with the others of the same class spoken of, fills up the gap thus far existing, in regard to volatility, between ether, which boils at 90°, and liquefied nitrous oxide and carbonic acid, which boil at 130° and 112° below zero. The liquids of which the boiling-points are between these limits are difficult to procure, and expensive, with the exception of sulphurous acid and ammonia, which are objectionable in some respects, notwithstanding the last has successfully been used for the manufacture of ice on a large scale. Ether has also been used with some success, notwithstanding its temperature of liquefaction, *i. e.*, its boiling-point, is too high to use it advantageously for this purpose. It has, however, the defect, from which also the ammonia is not free, to attack and dissolve the fats, oils, and grease, which is a practical objection in the management of the lubricated exhaust and condensing pumps used for this purpose. My chimogene being not only free from this objection, but itself a lubricator, protecting the machinery most perfectly from rust, has also the advantage over carbonic acid and nitrous oxide, which, in the course of time, act on the metals, and also require too strong a pressure to be liquefied and used advantageously.

Another great advantage is that it can be procured so cheaply, being nothing but a material now entirely wasted in all petroleum-distilleries and at the oil-wells. When manufactured at the last-mentioned localities its boiling-point may be obtained almost as low as that of ammonia. The vapors evolved from petroleum graduating down, in regard to their condensability, from the uncondensable marsh-gas $C_2H_4$ to the condensable hydride of ethyle $C_4H_6$, the liquid and very volatile hydride of propyle, or chimogene $C_6H_8$, the hydride of butyle, or gasoline $C_8H_{10}$, the hydrides of amyle and caprotyle, or benzine $C_{10}H_{12}$ and $C_{12}H_{14}$, &c., all after the law of the homologous compounds, preferring a higher boiling-point, in proportion that the coefficients increase. Finally, after pressing the kerosene, which corresponds about with $C_{32}H_{34}$, or hydride of cetyle, we reach the solid paraffine, of which the formula range from $C_{40}H_{42}$ to $C_{48}H_{50}$. The lightest of these products are, after the law of the diffusion of gases, very soluble in one another in all proportions, and therefore difficult to separate perfectly.

I must observe that the gas given off at the end of the distillation of petroleum is entirely different, and similar to olefiant gas $C_4H_4$, which is only condensable at very high pressures, (above forty atmospheres.) It is a product of destructive distillation taking place at high temperature, after all the excess of hydrogen is driven off in combination with the above-mentioned products.

This same liquefied gas may also be used as an illuminating and heating agent, when allowed to escape, by its own expansion, from a vessel containing it, provided only that the escape be not so rapid as to cool the remaining liquid too far below its boiling-point. The heat of the combustion, however, is usually sufficient to keep up the required temperature, when regulated with a stop-cock, and not too far removed from the vessel containing the liquid.

But even less volatile liquids may be made to serve as illuminating and heating agents in another manner, namely, by causing a blast of any gas which is a supporter of combustion to pass over the upper narrow orifice of a tube, of which the lower end is plunged in the liquid. By this way a spray is produced which gives a very powerful flame. In fact, an apparatus similar to the so-called atomizer, now extensively used to produce a cooling spray of ether, may be applied for this very purpose. When placed under a steam-boiler, and mixing a spray of heated crude petroleum with hot air and a small quantity of steam, its ignition produces a most efficient steam-generating flame of great height. As a substitute for the hydro-oxygen blow-pipe, I take two small and strong vessels, one filled with the liquefied petroleum-gas, the other with liquefied nitrous oxide, and use the ignited gaseous jets for a Drummond light, magic-lantern, &c., for which it is exceedingly well adapted by reason of the very small space it occupies, dispensing thus entirely with gas bags or reservoirs.

What I claim, and wish to secure by Letters Patent, is—

1. The manufacture of hydride of propyle or chimogene, from the so-called non-condensable gases escaping from any petroleum-still, by condensing them in a coil exposed to a freezing-mixture, or by submitting them to the powerful pressure of a pump, or by both.

2. I claim the boiling of crude or refined petroleum at the common temperature by the suction of a vacuum, agitating it, and condensing the vapors produced by cold or pressure, or by both, thus producing a highly volatile liquid, boiling at about 30° Fahrenheit, and corresponding with hydride of ethyle.

3. The application of these liquefied gases, or of gasoline, or any other very volatile product of petroleum, to the making of ice and of cooling in general.

4. The temporary preservation of dead bodies by the perfectly dry cold produced, by placing in the coffin one or more long, narrow cylinders filled with the above-described liquefied hydrocarbon gases, or with liquefied sulphurous acid, carbonic acid, or nitrous oxide, or their equivalents, from which cylinders the gas is slowly escaping, regulated by a stop-cock, and thus maintaining any desired low temperature, the escaping gas at the same time serving as a preservative and disinfectant.

5. The use of the above-described or other products of petroleum, or the use of crude petroleum, when escaping, either by their own pressure, or projected as a spray by the atomizing action of a blast of air, oxygen, or nitrous oxide, for an illuminating and heating agent, either under a steam-boiler using petroleum, in combination with a blast of air or steam, or both, as above described, or for a lime-light or blow-pipe, requiring only two very small vessels, each containing one of the liquefied gases—petroleum-gas and nitrous-oxide gas—as substitutes for the non-condensable hydrogen and oxygen.

In witness of which I have signed my name to this specification.

P. H. VANDER WEYDE, M. D.

Witnesses:
 Z. W. LASPERRE,
 JAS. BUSEY.